(12) United States Patent
Chandy

(10) Patent No.: US 10,481,602 B2
(45) Date of Patent: Nov. 19, 2019

(54) SENSOR FUSION FOR AUTONOMOUS DRIVING TRANSITION CONTROL

(71) Applicant: Steering Solutions IP Holding Corporation, Saginaw, MI (US)

(72) Inventor: Ashok Chandy, Palo Alto, CA (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 232 days.

(21) Appl. No.: 15/295,039

(22) Filed: Oct. 17, 2016

(65) Prior Publication Data

US 2018/0107214 A1    Apr. 19, 2018

(51) Int. Cl.
| | |
|---|---|
| *G05D 1/00* | (2006.01) |
| *B60R 11/04* | (2006.01) |
| *B60W 40/08* | (2012.01) |
| *B62D 5/04* | (2006.01) |
| *B62D 6/10* | (2006.01) |
| *B62D 15/02* | (2006.01) |
| *B62D 1/28* | (2006.01) |
| *B60W 30/10* | (2006.01) |

(52) U.S. Cl.
CPC ............ *G05D 1/0061* (2013.01); *B60R 11/04* (2013.01); *B60W 30/10* (2013.01); *B60W 40/08* (2013.01); *B62D 1/286* (2013.01); *B62D 5/0424* (2013.01); *B62D 6/10* (2013.01); *B62D 15/025* (2013.01); *B60K 2370/175* (2019.05); *B60W 2040/0818* (2013.01); *B60W 2420/42* (2013.01); *B60W 2510/20* (2013.01); *B60W 2510/202* (2013.01); *B60W 2510/205* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 4,315,117 A | 2/1982 | Kokubo et al. | |
| 4,337,967 A | 7/1982 | Yoshida et al. | |
| 4,503,300 A | 3/1985 | Lane, Jr. | |
| 4,503,504 A | 3/1985 | Suzumura et al. | |
| 4,561,323 A | 12/1985 | Stromberg | |

(Continued)

FOREIGN PATENT DOCUMENTS

| | | |
|---|---|---|
| CN | 1722030 | 1/2006 |
| CN | 1736786 | 2/2006 |

(Continued)

OTHER PUBLICATIONS

China Patent Application No. 201510204221.5 Second Office Action dated Mar. 10, 2017, 8 pages.

(Continued)

*Primary Examiner* — Nicholas K Wiltey

(57) ABSTRACT

A system for sensor fusion for autonomous driving transition control includes a sensor fusion module and a decision making module. The sensor fusion module fuses a plurality of steering sensor data from one or more sensors of a steering system with a plurality of driver state data from a plurality of driver state sensors as a plurality of fused state data aligned in time. The decision making module determines whether to transition from an autonomous driving mode to a manual driving mode based on the fused state data.

20 Claims, 4 Drawing Sheets

(56) References Cited

U.S. PATENT DOCUMENTS

| | | | |
|---|---|---|---|
| 4,691,587 | A | 9/1987 | Farrand et al. |
| 4,836,566 | A | 6/1989 | Birsching |
| 4,921,066 | A | 5/1990 | Conley |
| 4,962,570 | A | 10/1990 | Hosaka et al. |
| 4,967,618 | A | 11/1990 | Matsumoto et al. |
| 4,976,239 | A | 12/1990 | Hosaka |
| 5,240,284 | A | 8/1993 | Takada et al. |
| 5,295,712 | A | 3/1994 | Omura |
| 5,319,803 | A | 6/1994 | Allen |
| 5,469,356 | A * | 11/1995 | Hawkins ............... G01C 21/26 318/591 |
| 5,488,555 | A | 1/1996 | Asgari et al. |
| 5,618,058 | A | 4/1997 | Byon |
| 5,668,721 | A | 9/1997 | Chandy |
| 5,690,362 | A | 11/1997 | Peitsmeier et al. |
| 5,765,116 | A | 6/1998 | Wilson-Jones et al. |
| 5,893,580 | A | 4/1999 | Hoagland et al. |
| 5,911,789 | A | 6/1999 | Keipert et al. |
| 6,070,686 | A | 6/2000 | Pollmann |
| 6,138,788 | A | 10/2000 | Bohner et al. |
| 6,170,862 | B1 | 1/2001 | Hoagland et al. |
| 6,212,453 | B1 | 4/2001 | Kawagoe et al. |
| 6,227,571 | B1 | 5/2001 | Sheng et al. |
| 6,256,561 | B1 | 7/2001 | Asanuma |
| 6,301,534 | B1 | 10/2001 | McDermott, Jr. et al. |
| 6,354,622 | B1 | 3/2002 | Ulbrich et al. |
| 6,360,149 | B1 | 3/2002 | Kwon et al. |
| 6,373,472 | B1 | 4/2002 | Palalau et al. |
| 6,381,526 | B1 | 4/2002 | Higashi et al. |
| 6,390,505 | B1 | 5/2002 | Wilson |
| 6,481,526 | B1 | 11/2002 | Millsap et al. |
| 6,575,263 | B2 | 6/2003 | Hjelsand et al. |
| 6,578,449 | B1 | 6/2003 | Anspaugh et al. |
| 6,598,695 | B1 | 7/2003 | Menjak et al. |
| 6,611,745 | B1 | 8/2003 | Paul |
| 6,612,392 | B2 | 9/2003 | Park et al. |
| 6,612,393 | B2 | 9/2003 | Bohner et al. |
| 6,778,890 | B2 | 8/2004 | Shimakage et al. |
| 6,799,654 | B2 | 10/2004 | Menjak et al. |
| 6,817,437 | B2 | 11/2004 | Magnus et al. |
| 6,819,990 | B2 | 11/2004 | Ichinose |
| 6,820,713 | B2 | 11/2004 | Menjak et al. |
| 6,889,792 | B1 | 5/2005 | Fardoun et al. |
| 7,021,416 | B2 | 4/2006 | Kapaan et al. |
| 7,048,305 | B2 | 5/2006 | Muller |
| 7,062,365 | B1 | 6/2006 | Fei |
| 7,295,904 | B2 | 11/2007 | Kanevsky et al. |
| 7,308,964 | B2 | 12/2007 | Hara et al. |
| 7,428,944 | B2 | 9/2008 | Gerum |
| 7,461,863 | B2 | 12/2008 | Muller |
| 7,495,584 | B1 | 2/2009 | Sorensen |
| 7,628,244 | B2 | 12/2009 | Chino et al. |
| 7,719,431 | B2 | 5/2010 | Bolourchi |
| 7,735,405 | B2 | 6/2010 | Parks |
| 7,793,980 | B2 | 9/2010 | Fong |
| 7,862,079 | B2 | 1/2011 | Fukawatase et al. |
| 7,894,951 | B2 | 2/2011 | Norris et al. |
| 7,909,361 | B2 | 3/2011 | Oblizajek et al. |
| 8,002,075 | B2 | 8/2011 | Markfort |
| 8,027,767 | B2 | 9/2011 | Klein et al. |
| 8,055,409 | B2 | 11/2011 | Tsuchiya |
| 8,069,745 | B2 | 12/2011 | Strieter et al. |
| 8,079,312 | B2 | 12/2011 | Long |
| 8,146,945 | B2 | 4/2012 | Born et al. |
| 8,150,581 | B2 | 4/2012 | Iwazaki et al. |
| 8,170,725 | B2 | 5/2012 | Chin et al. |
| 8,260,482 | B1 | 9/2012 | Szybalski et al. |
| 8,352,110 | B1 * | 1/2013 | Szybalski ............... B62D 1/286 701/23 |
| 8,452,492 | B2 | 5/2013 | Buerkle et al. |
| 8,479,605 | B2 | 7/2013 | Shavrnoch et al. |
| 8,548,667 | B2 | 10/2013 | Kaufmann |
| 8,606,455 | B2 | 12/2013 | Boehringer et al. |
| 8,632,096 | B1 | 1/2014 | Quinn et al. |
| 8,634,980 | B1 | 1/2014 | Urmson et al. |
| 8,650,982 | B2 | 2/2014 | Matsuno et al. |
| 8,670,891 | B1 | 3/2014 | Szybalski et al. |
| 8,695,750 | B1 | 4/2014 | Hammond et al. |
| 8,725,230 | B2 | 5/2014 | Lisseman et al. |
| 8,798,852 | B1 | 8/2014 | Chen et al. |
| 8,818,608 | B2 * | 8/2014 | Cullinane ............ B60W 30/00 701/23 |
| 8,825,258 | B2 | 9/2014 | Cullinane et al. |
| 8,825,261 | B1 | 9/2014 | Szybalski et al. |
| 8,843,268 | B2 | 9/2014 | Lathrop et al. |
| 8,874,301 | B1 | 10/2014 | Rao et al. |
| 8,880,287 | B2 | 11/2014 | Lee et al. |
| 8,881,861 | B2 | 11/2014 | Tojo |
| 8,899,623 | B2 | 12/2014 | Stadler et al. |
| 8,909,428 | B1 | 12/2014 | Lombrozo |
| 8,915,164 | B2 | 12/2014 | Moriyama |
| 8,948,993 | B2 | 2/2015 | Schulman et al. |
| 8,950,543 | B2 | 2/2015 | Heo et al. |
| 8,994,521 | B2 | 3/2015 | Gazit |
| 9,002,563 | B2 | 4/2015 | Green et al. |
| 9,031,729 | B2 | 5/2015 | Lathrop et al. |
| 9,032,835 | B2 | 5/2015 | Davies et al. |
| 9,045,078 | B2 | 6/2015 | Tovar et al. |
| 9,073,574 | B2 | 7/2015 | Cuddihy et al. |
| 9,092,093 | B2 | 7/2015 | Jubner et al. |
| 9,108,584 | B2 | 8/2015 | Rao et al. |
| 9,134,729 | B1 | 9/2015 | Szybalski et al. |
| 9,150,200 | B2 | 10/2015 | Urhahne |
| 9,150,224 | B2 | 10/2015 | Yopp |
| 9,159,221 | B1 | 10/2015 | Stantchev |
| 9,164,619 | B2 | 10/2015 | Goodlein |
| 9,174,642 | B2 | 11/2015 | Wimmer et al. |
| 9,186,994 | B2 | 11/2015 | Okuyama et al. |
| 9,193,375 | B2 | 11/2015 | Schramm et al. |
| 9,199,553 | B2 | 12/2015 | Cuddihy et al. |
| 9,207,856 | B2 | 12/2015 | Imai |
| 9,227,531 | B2 | 1/2016 | Cuddihy et al. |
| 9,233,638 | B2 | 1/2016 | Lisseman et al. |
| 9,235,111 | B2 | 1/2016 | Davidsson et al. |
| 9,235,211 | B2 | 1/2016 | Davidsson et al. |
| 9,235,987 | B2 | 1/2016 | Green et al. |
| 9,238,409 | B2 | 1/2016 | Lathrop et al. |
| 9,248,743 | B2 | 2/2016 | Enthaler et al. |
| 9,260,130 | B2 | 2/2016 | Mizuno |
| 9,290,174 | B1 | 3/2016 | Zagorski |
| 9,290,201 | B1 | 3/2016 | Lombrozo |
| 9,298,184 | B2 | 3/2016 | Bartels et al. |
| 9,308,857 | B2 | 4/2016 | Lisseman et al. |
| 9,308,891 | B2 | 4/2016 | Cudak et al. |
| 9,315,210 | B2 | 4/2016 | Sears et al. |
| 9,333,983 | B2 | 5/2016 | Lathrop et al. |
| 9,360,865 | B2 | 6/2016 | Yopp |
| 9,714,036 | B2 * | 7/2017 | Yamaoka ............ B60W 30/182 |
| 9,725,098 | B2 | 8/2017 | Abou-Nasr et al. |
| 9,810,727 | B2 | 11/2017 | Kandler et al. |
| 9,852,752 | B1 | 12/2017 | Chou et al. |
| 9,868,449 | B1 | 1/2018 | Holz et al. |
| 2003/0046012 | A1 | 3/2003 | Yamaguchi |
| 2003/0094330 | A1 | 5/2003 | Boloorchi et al. |
| 2003/0227159 | A1 | 12/2003 | Muller |
| 2004/0016588 | A1 | 1/2004 | Vitale et al. |
| 2004/0046346 | A1 | 3/2004 | Eki et al. |
| 2004/0099468 | A1 | 5/2004 | Chernoff et al. |
| 2004/0129098 | A1 | 7/2004 | Gayer et al. |
| 2004/0182640 | A1 | 9/2004 | Katou et al. |
| 2004/0204808 | A1 | 10/2004 | Satoh et al. |
| 2004/0262063 | A1 | 12/2004 | Kaufmann et al. |
| 2005/0001445 | A1 | 1/2005 | Ercolano |
| 2005/0081675 | A1 | 4/2005 | Oshita et al. |
| 2005/0155809 | A1 | 7/2005 | Krzesicki et al. |
| 2005/0197746 | A1 | 9/2005 | Pelchen et al. |
| 2005/0275205 | A1 | 12/2005 | Ahnafield |
| 2006/0224287 | A1 | 10/2006 | Izawa et al. |
| 2006/0244251 | A1 | 11/2006 | Muller |
| 2006/0271348 | A1 | 11/2006 | Rossow et al. |
| 2007/0021889 | A1 | 1/2007 | Tsuchiya |
| 2007/0029771 | A1 | 2/2007 | Haglund et al. |
| 2007/0046003 | A1 | 3/2007 | Mori et al. |
| 2007/0046013 | A1 | 3/2007 | Bito |

(56) References Cited

U.S. PATENT DOCUMENTS

| | | | |
|---|---|---|---|
| 2007/0198145 A1* | 8/2007 | Norris | B60T 7/22 |
| | | | 701/23 |
| 2007/0241548 A1 | 10/2007 | Fong | |
| 2007/0284867 A1 | 12/2007 | Cymbal et al. | |
| 2008/0009986 A1 | 1/2008 | Lu et al. | |
| 2008/0238068 A1 | 10/2008 | Kumar et al. | |
| 2009/0024278 A1 | 1/2009 | Kondo et al. | |
| 2009/0189373 A1 | 7/2009 | Schramm et al. | |
| 2009/0256342 A1 | 10/2009 | Cymbal et al. | |
| 2009/0276111 A1 | 11/2009 | Wang et al. | |
| 2009/0292466 A1 | 11/2009 | McCarthy et al. | |
| 2010/0152952 A1 | 6/2010 | Lee et al. | |
| 2010/0222976 A1 | 9/2010 | Haug | |
| 2010/0228417 A1 | 9/2010 | Lee et al. | |
| 2010/0228438 A1 | 9/2010 | Buerkle | |
| 2010/0250081 A1 | 9/2010 | Kinser et al. | |
| 2010/0280713 A1 | 11/2010 | Stahlin et al. | |
| 2010/0286869 A1 | 11/2010 | Katch et al. | |
| 2010/0288567 A1 | 11/2010 | Bonne | |
| 2011/0098922 A1 | 4/2011 | Ibrahim | |
| 2011/0153160 A1 | 6/2011 | Hesseling et al. | |
| 2011/0167940 A1 | 7/2011 | Shavrnoch et al. | |
| 2011/0187518 A1 | 8/2011 | Strumolo et al. | |
| 2011/0245643 A1* | 10/2011 | Lisseman | A61B 5/01 |
| | | | 600/372 |
| 2011/0266396 A1 | 11/2011 | Abildgaard et al. | |
| 2011/0282550 A1 | 11/2011 | Tada et al. | |
| 2012/0136540 A1 | 5/2012 | Miller | |
| 2012/0150388 A1 | 6/2012 | Boissonnier et al. | |
| 2012/0197496 A1 | 8/2012 | Limpibunterng et al. | |
| 2012/0205183 A1 | 8/2012 | Rombold | |
| 2012/0209473 A1 | 8/2012 | Birsching et al. | |
| 2012/0215377 A1 | 8/2012 | Takemura et al. | |
| 2013/0002416 A1* | 1/2013 | Gazit | B62D 1/28 |
| | | | 340/438 |
| 2013/0325202 A1 | 1/2013 | Howard et al. | |
| 2013/0087006 A1 | 4/2013 | Ohtsubo et al. | |
| 2013/0131906 A1* | 5/2013 | Green | G05D 1/0055 |
| | | | 701/23 |
| 2013/0158771 A1 | 6/2013 | Kaufmann | |
| 2013/0218396 A1 | 8/2013 | Moshchuk et al. | |
| 2013/0233117 A1 | 9/2013 | Read et al. | |
| 2013/0253765 A1 | 9/2013 | Bolourchi et al. | |
| 2013/0292955 A1 | 11/2013 | Higgins et al. | |
| 2014/0028008 A1 | 1/2014 | Stadler et al. | |
| 2014/0046542 A1 | 2/2014 | Kauffman et al. | |
| 2014/0046547 A1 | 2/2014 | Kaufmann et al. | |
| 2014/0111324 A1 | 4/2014 | Lisseman et al. | |
| 2014/0152551 A1 | 6/2014 | Mueller et al. | |
| 2014/0156107 A1 | 6/2014 | Karasawa et al. | |
| 2014/0168061 A1 | 6/2014 | Kim | |
| 2014/0172231 A1 | 6/2014 | Terada et al. | |
| 2014/0277896 A1 | 9/2014 | Lathrop et al. | |
| 2014/0277945 A1 | 9/2014 | Chandy | |
| 2014/0300479 A1 | 10/2014 | Wolter et al. | |
| 2014/0303827 A1* | 10/2014 | Dolgov | B60W 30/00 |
| | | | 701/23 |
| 2014/0306799 A1 | 10/2014 | Ricci | |
| 2014/0309816 A1 | 10/2014 | Stefan et al. | |
| 2014/0354568 A1 | 12/2014 | Andrews et al. | |
| 2015/0002404 A1 | 1/2015 | Hooton | |
| 2015/0006033 A1 | 1/2015 | Sekiya | |
| 2015/0014086 A1 | 1/2015 | Eisenbarth | |
| 2015/0032322 A1 | 1/2015 | Wimmer | |
| 2015/0032334 A1 | 1/2015 | Jang | |
| 2015/0051780 A1 | 1/2015 | Hahne | |
| 2015/0120142 A1 | 1/2015 | Park et al. | |
| 2015/0210273 A1 | 2/2015 | Kaufmann et al. | |
| 2015/0060185 A1 | 3/2015 | Feguri | |
| 2015/0120124 A1 | 4/2015 | Bartels et al. | |
| 2015/0120141 A1 | 4/2015 | Lavoie et al. | |
| 2015/0246673 A1 | 4/2015 | Tseng et al. | |
| 2015/0123947 A1 | 5/2015 | Jubner et al. | |
| 2015/0149035 A1 | 5/2015 | Enthaler et al. | |
| 2015/0251666 A1 | 7/2015 | Attard et al. | |
| 2015/0283998 A1 | 9/2015 | Lind et al. | |
| 2015/0324111 A1 | 11/2015 | Jubner et al. | |
| 2015/0338849 A1 | 11/2015 | Nemec et al. | |
| 2016/0001781 A1* | 1/2016 | Fung | B60W 40/08 |
| | | | 701/36 |
| 2016/0009332 A1 | 1/2016 | Sirbu | |
| 2016/0071418 A1* | 3/2016 | Oshida | G08G 1/22 |
| | | | 701/23 |
| 2016/0075371 A1 | 3/2016 | Varunkikar et al. | |
| 2016/0082867 A1 | 3/2016 | Sugioka et al. | |
| 2016/0200246 A1 | 3/2016 | Lisseman et al. | |
| 2016/0185387 A1 | 6/2016 | Kuoch | |
| 2016/0200343 A1 | 6/2016 | Lisseman et al. | |
| 2016/0200344 A1 | 7/2016 | Sugioka et al. | |
| 2016/0207536 A1* | 7/2016 | Yamaoka | B60W 30/182 |
| 2016/0207538 A1 | 7/2016 | Urano et al. | |
| 2016/0209841 A1 | 7/2016 | Yamaoka et al. | |
| 2016/0229450 A1 | 7/2016 | Basting et al. | |
| 2016/0231743 A1 | 7/2016 | Bendewald et al. | |
| 2016/0244070 A1 | 8/2016 | Bendewald et al. | |
| 2016/0347347 A1 | 8/2016 | Lubischer | |
| 2016/0347348 A1 | 8/2016 | Lubischer | |
| 2016/0291862 A1 | 10/2016 | Yaron et al. | |
| 2016/0318540 A1 | 11/2016 | King | |
| 2016/0318542 A1 | 11/2016 | Pattok et al. | |
| 2016/0355207 A1 | 12/2016 | Urushibata | |
| 2016/0362084 A1 | 12/2016 | Martin et al. | |
| 2016/0362117 A1 | 12/2016 | Kaufmann et al. | |
| 2016/0362126 A1 | 12/2016 | Lubischer | |
| 2016/0364003 A1 | 12/2016 | O'Brien | |
| 2016/0368522 A1 | 12/2016 | Lubischer | |
| 2016/0375860 A1 | 12/2016 | Lubischer | |
| 2016/0375923 A1 | 12/2016 | Schulz | |
| 2016/0375925 A1 | 12/2016 | Lubischer et al. | |
| 2016/0375926 A1 | 12/2016 | Lubischer et al. | |
| 2016/0375927 A1 | 12/2016 | Schulz et al. | |
| 2016/0375928 A1 | 12/2016 | Magnus | |
| 2016/0375929 A1 | 12/2016 | Rouleau | |
| 2016/0375931 A1 | 12/2016 | Lubischer | |
| 2017/0029009 A1 | 2/2017 | Rouleau | |
| 2017/0029018 A1 | 2/2017 | Lubischer | |
| 2017/0101032 A1 | 4/2017 | Sugioka et al. | |
| 2017/0113712 A1 | 4/2017 | Watz | |
| 2017/0151950 A1* | 6/2017 | Lien | B60W 30/182 |
| 2017/0151978 A1 | 6/2017 | Oya et al. | |
| 2017/0158055 A1 | 6/2017 | Kim et al. | |
| 2017/0158222 A1 | 6/2017 | Schulz et al. | |
| 2017/0166222 A1* | 6/2017 | James | B60W 50/14 |
| 2017/0225704 A1 | 8/2017 | Urushibata | |
| 2017/0240204 A1 | 8/2017 | Raad et al. | |
| 2017/0242428 A1* | 8/2017 | Pal | H04W 4/90 |
| 2017/0293306 A1 | 10/2017 | Riefe et al. | |
| 2017/0297606 A1 | 10/2017 | Kim et al. | |
| 2017/0305425 A1 | 10/2017 | Xing | |
| 2017/0305458 A1 | 10/2017 | Wang et al. | |
| 2017/0334458 A1* | 11/2017 | Sato | B60W 50/12 |
| 2018/0017968 A1* | 1/2018 | Zhu | B60W 50/08 |
| 2018/0029632 A1 | 2/2018 | Bodtker | |
| 2018/0059661 A1* | 3/2018 | Sato | B60W 40/04 |
| 2018/0059662 A1* | 3/2018 | Sato | B60K 35/00 |
| 2018/0072341 A1 | 3/2018 | Schulz et al. | |
| 2018/0093700 A1 | 4/2018 | Chandy | |
| 2018/0105198 A1 | 4/2018 | Bodtker et al. | |

FOREIGN PATENT DOCUMENTS

| | | |
|---|---|---|
| CN | 101037117 | 9/2007 |
| CN | 101041355 | 9/2007 |
| CN | 101596903 | 12/2009 |
| CN | 102027458 A | 4/2011 |
| CN | 102320324 A | 1/2012 |
| CN | 102452391 | 5/2012 |
| CN | 202563346 U | 11/2012 |
| CN | 102939474 | 2/2013 |
| CN | 103419840 | 12/2013 |
| CN | 103448785 A | 12/2013 |
| CN | 103677253 A | 3/2014 |
| CN | 103818386 A | 5/2014 |

(56) References Cited

FOREIGN PATENT DOCUMENTS

| | | |
|---|---|---|
| CN | 104968554 | 10/2015 |
| DE | 19523214 A1 | 1/1997 |
| DE | 19923012 | 11/2000 |
| DE | 10212782 A1 | 10/2003 |
| DE | 102005032528 | 1/2007 |
| DE | 102005056438 A1 | 6/2007 |
| DE | 102006025254 | 12/2007 |
| DE | 102008057313 | 10/2009 |
| DE | 102010025197 A1 | 12/2011 |
| DE | 102013110865 A1 | 4/2015 |
| EP | 1559630 A2 | 8/2005 |
| EP | 1783719 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 | 5/2005 |
| FR | 3016327 A1 | 7/2015 |
| JP | S60157963 A | 8/1985 |
| JP | S60164629 A | 8/1985 |
| JP | H105162652 | 6/1993 |
| JP | 2007253809 A | 10/2007 |
| JP | 20174099 A | 1/2017 |
| KR | 20100063433 A | 6/2010 |
| WO | 2006099483 A1 | 9/2006 |
| WO | 2007034567 A1 | 3/2007 |
| WO | 2010082394 A1 | 7/2010 |
| WO | 2010116518 | 10/2010 |
| WO | 2013101058 A1 | 7/2013 |

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "FUndamentals of Vehicla Dynamics"; Society of Automotive Enginers, Inc.; published 1992; 294 pages.
Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.
Partial European Search Report for related European Patent Application No. 14156903.8, dated Sep. 23, 2014, 6 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Varunjikar, Tejas; Design of Horizontal Curves With DownGrades Using Low-Order Vehicle Dynamics Models; A Theisis by T. Varunkikar; 2011; 141 pages.
CN Patent Application No. 201610575225.9 First Office Action dated Jan. 22, 2018, 10 pages.
English Translation of Chinese Office Action and Search Report for Chinese Application No. 201210599006.6 dated Jan. 27, 2015, 9 pages.
English Translation of Chinese Office Action and Search Report for Chinese Application No. 201310178012.9 dated Apr. 13, 2015, 13 pages.
English Translation of Chinese Office Action and Search Report for Chinese Application No. 201410089167.X dated Feb. 3, 2016, 9 pages.
English Translation of Chinese Office Action and Search Report for Chinese Application No. 2016103666609.X dated Dec. 20, 2017, 8 pages.
European Search Report for European Patent Application No. 14156903.8 dated Jan. 27, 2015, 10 pages.
English Translation of Chinese Office Action and Search Report for Chinese Application No. 201610832736.4 dated Mar. 22, 2018, 6 pages.
Chinese Office Action and Search Report from the Chinese Patent Office for CN Application No. 201610575225.9 dated Oct. 16, 2018, 19 pages, English Translation Included.
Chinese Office Action from the Chinese Patent Office for CN Application No. 2017102318205 dated Oct. 12, 2018, 7 pages, English Translation Only.
Chinese Office Action from the CN Patent Office for CN Application No. 201610832736.4 dated Oct. 16, 2018, 18 pages, English Translation Included.
CN Patent Application No. 201611096572 First Office Action dated Aug. 1, 2018, 12 pages.

* cited by examiner

SENSOR FUSION FOR AUTONOMOUS DRIVING TRANSITION CONTROL

BACKGROUND OF THE INVENTION

Advanced driver assistance systems (ADAS) and automated driving systems are beginning to use a sensing system to monitor driver state when a vehicle is being driven autonomously or near autonomously (semi-autonomously). These systems need to monitor the driver to ensure that the driver state is appropriate for the driving mode. Examples include built-in steering and torque sensors to estimate driver input, steering wheel touch sensors to check for presence of a driver's hand on the steering wheel for lane keeping assistance and similar functions, and camera monitoring to ensure the driver state is sufficiently attentive for the hands-free driving condition, i.e., the driver is not sleeping or taking eyes off the road for more than a stipulated interval.

However, each one of these sensing systems has limitations when transitioning from automated driving to manual driving. If the transition was not the intent of the driver, then a safety hazard is created as the system would have relinquished control to a human who is not ready to take over. Consider an application where built-in steering system torque & position sensors are used to detect driver input as a signal to override autonomous control and transition to manual control. If in this situation something other than the driver's hands were the source of steering input (e.g., the driver's knee contacted the steering wheel), then the system could end up transitioning to manual driving contrary to the driver's intent, thus creating a hazard.

SUMMARY OF THE INVENTION

A system for sensor fusion for autonomous driving transition control includes a sensor fusion module and a decision making module. The sensor fusion module fuses a plurality of steering sensor data from one or more sensors of a steering system with a plurality of driver state data from a plurality of driver state sensors as a plurality of fused state data aligned in time. The decision making module determines whether to transition from an autonomous driving mode to a manual driving mode based on the fused state data.

A steering system includes one or more sensors operable to produce a plurality of steering sensor data, a plurality of driver state sensors operable to produce a plurality of driver state data, a steering actuator motor, and a control module. The control module is operable to operate the steering actuator motor in an autonomous driving mode and in a manual driving mode. The control module is further operable to fuse the steering sensor data with the driver state data as a plurality of fused state data aligned in time and determine whether to transition from the autonomous driving mode to the manual driving mode based on the fused state data.

A method for sensor fusion for autonomous driving transition control includes acquiring, by a control module, a plurality of steering sensor data from one or more sensors of a steering system and acquiring a plurality of driver state data from a plurality of driver state sensors. The steering sensor data are fused with the driver state data as a plurality of fused state data aligned in time. The control module determines whether to transition from an autonomous driving mode to a manual driving mode based on the fused state data.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
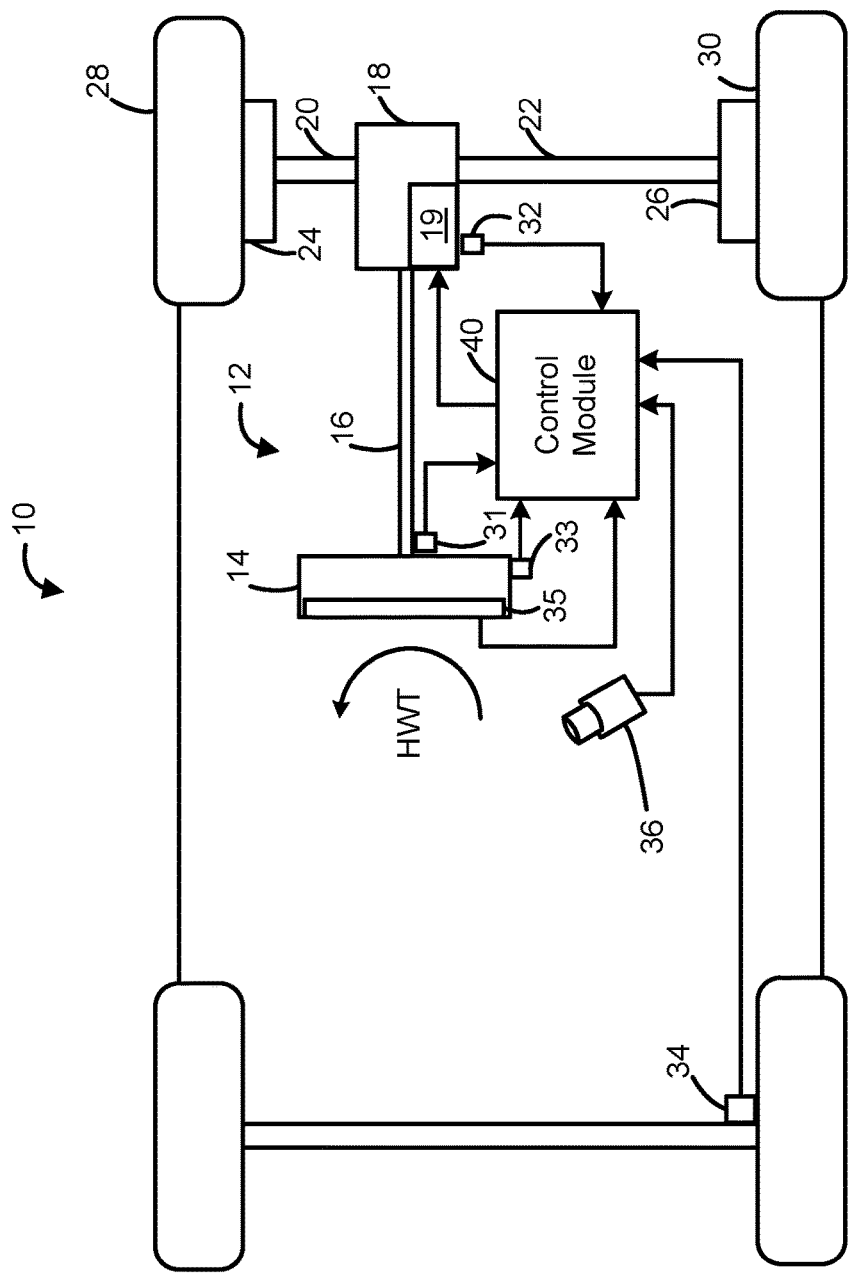
FIG. 1 illustrates a functional block diagram illustrating a vehicle including a steering system in accordance with some embodiments.

Referring now to the Figures, where the invention will be described with reference to specific embodiments, without limiting the same, an exemplary embodiment of a vehicle 10 including a steering system 12 is illustrated. In various embodiments, the steering system 12 includes a handwheel 14 coupled to a steering shaft 16. In the exemplary embodiment shown, the steering system 12 is an electric power steering (EPS) system that further includes a steering assist unit 18 that couples to the steering shaft 16 of the steering system 12 and to a left tie rod 20 and a right tie rod 22 of the vehicle 10. It should be noted that the steering system 12 may be a rack assist EPS (REPS) as well. The steering assist unit 18 includes, for example, a rack and pinion steering mechanism (not shown) that may be coupled through the steering shaft 16 to a steering actuator motor 19 and gearing. During operation, as the handwheel 14 is turned by a vehicle operator, the steering actuator motor 19 provides the assistance to move the left tie rod 20 and the right tie rod 22 which in turn moves left and right steering knuckles 24, 26, respectively. The left knuckle 24 is coupled to a left roadway wheel 28, and the right knuckle 26 is coupled to a right roadway wheel 30 of the vehicle 10.

As shown in FIG. 1, the vehicle 10 further includes various sensors 31-36 that detect and measure signals of the steering system 12, of the vehicle 10, and driver attentiveness. The sensors 31-36 generate sensor signals based on the measured/observed signals. In one embodiment, a handwheel torque sensor 31 is provided for sensing a torque placed on the handwheel 14. In the exemplary embodiment as shown, the handwheel torque sensor 31 is placed on the handwheel 14, however it is to be understood that the handwheel torque sensor 31 may not always be placed near or on the handwheel 14. In one embodiment, a motor position/velocity sensor 32 senses motor position and/or velocity, and a handwheel position/velocity sensor 33 senses handwheel position and/or velocity. In addition, the vehicle 10 may include a wheel speed sensor 34 to assist in measuring vehicle speed. In some embodiments, one or more handwheel touch sensors 35 measure a grip force or pressure on the handwheel 14 at various locations that be detected as an area of contact with the handwheel 14, a width of contact with the handwheel 14, a force of contact with the handwheel 14, and/or a position of contact with the handwheel 14. Data from one or more handwheel touch sensors 35 can include magnitude in combination with angular position. A camera 36 can detect one or more of: a driver body posture, a driver head pose, a driver eye gaze, and a driver hand position. The camera 36 can be mounted in any suitable location to monitor the driver's body and/or face and/or eyes and/or hands. For instance, the camera 36 can be mounted in a steering column, an instrument panel, an A-pillar, or an overhead console. In some embodiments, multiple cameras 36 are utilized to collect image data from various angles/locations. The one or more handwheel touch sensors 35 and camera 36 are also referred to as driver state sensors which collect information about the attentiveness of the driver.

A control module 40 controls the operation of the steering system 12 based on one or more of the sensor signals and further based on the steering control systems and methods of the present disclosure. The control module 40 generates a command signal to control the steering actuator motor 19 of the steering system 12 based on one or more of the inputs and further based on the steering control systems and methods of the present disclosure. The steering control systems and methods of the present disclosure fuse state data aligned in time for two or more of the sensors 31-36 to determine whether to transition from an autonomous driving mode to a manual driving mode based on the fused state data. The control module 40 can be embodied in one or more controllers. It will be appreciated that such a system is capable of operating in both an autonomous state and in a manual driving mode, the overall vehicle system that is capable of operating in both states being a semi-autonomous vehicle.

Figure 2:
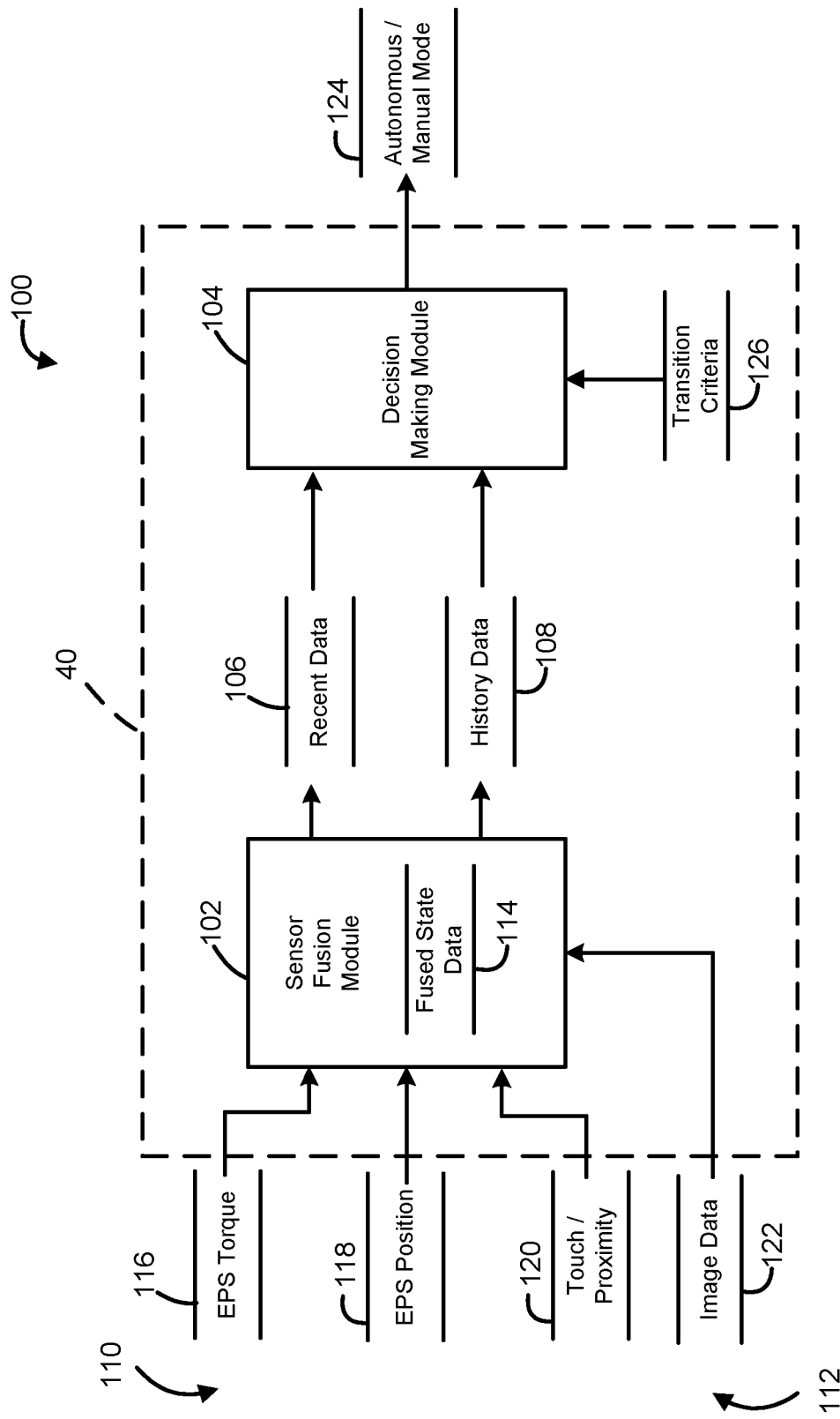
FIG. 2 illustrates a system for sensor fusion for autonomous driving transition control in accordance with some embodiments.

FIG. 2 illustrates a system 100 for grip-based handwheel compensation according to an embodiment. The system 100 includes control module 40 and receives data from two or more of the sensors 31-36 of FIG. 1. In various embodiments, the control module 40 can include one or more sub-modules and datastores, such as a sensor fusion module 102, a decision making module 104, a recent data store 106, and a history data store 108. As used herein the terms module and sub-module refer to an application specific integrated circuit (ASIC), an electronic circuit, a processor (shared, dedicated, or group) and memory that executes one or more software or firmware programs, a combinational logic circuit, or other suitable components that provide the described functionality. As can be appreciated, the control module 40 shown in FIG. 2 may be further partitioned and include additional control elements known in the art of steering control systems. For instance, the control module 40 or other module (not depicted) of the vehicle 10 of FIG. 1 can implement known techniques for automated steering control of the steering system 12 of FIG. 1.

Inputs to the control module 40 may be generated from the sensors 31-36 (FIG. 1) of the vehicle 10 (FIG. 1) as well as other sensors (not depicted). In addition, the inputs may be received from other control modules (not shown) within the vehicle 10 (FIG. 1), and may be modeled or predefined. Steering sensor data 110 from one or more of the sensors 31, 32, and 33 (FIG. 1) of the steering system 12 and driver state data 112 from one or more of driver state sensors 35 and 36 (FIG. 1) can be provided to the sensor fusion module 102 to fuse the steering sensor data 110 and the driver state data 112 as a plurality of fused state data 114 aligned in time. For example, the steering sensor data 110 can include sensed or derived data from one or more of the handwheel torque sensor 31 as EPS torque 116 and the handwheel position/velocity sensor 33 as EPS position 118. The driver state data 112 can include sensed or derived data from one or more of handwheel touch sensors 35 as touch/proximity data 120 and the camera 36 as image data 122. The touch/proximity data 120 can include a variety of sensed or derived data such as an area of contact with the handwheel 14 (FIG. 1), a width of contact with the handwheel 14, a force of contact with the handwheel 14, and/or a position of contact with the handwheel 14. The image data 122 can be used to determine various driver engagement indicators such as a driver body posture (e.g., straight, left, right, bent down, obstructed), a driver head pose (e.g., left, right, up, down, obstructed), a driver eye gaze (e.g., direction such as left/right/up/down or targeting specific objects such as road, instrument cluster, center stack, rear-view mirror, side-view mirror with a level of obstruction determined for either or both eyes), and/or a driver hand position (e.g., both hands visible and off handwheel 14, one-hand at an observed position on handwheel 14, both hands at observed positions on handwheel 14, both hands not visible or obstructed, etc.).

The recent data store 106 can hold a buffer of recently acquired values of the fused state data 114, for instance, a most recent 200 millisecond data fusion period. The history data store 108 collects older values of the fused state data 114 than collected in the recent data store 106, for instance, a 200 millisecond to a five second data fusion period. In some embodiments, the recent data store 106 can hold values of the fused state data 114 for a most recent 100 millisecond data fusion period, and the history data store 108 collects values of the fused state data 114 older than 100 milliseconds. Alternate data timing splits between the recent data store 106 and the history data store 108 are contemplated in other embodiments. In some embodiments, the recent data store 106 and the history data store 108 are combined in a single shared buffer, such as a circular buffer, where a first set of pointers identifies the locations of the recent data store 106 and a second set of pointers identifies the locations of the history data store 108.

The decision making module 104 determines whether to transition from an autonomous driving mode to a manual driving mode as a mode command 124 based on the fused state data 114. In embodiments, the decision making module 104 can average multiple samples of the fused state data 114 from the history data store 108 as time-averaged fused state data and determine whether to transition from the autonomous driving mode to the manual driving mode based on the fused state data 114 from the recent data store 106 in combination with the time-averaged fused state data. For example, transition criteria 126 can define a truth table to cover use cases for the recent data store 106 in combination with the history data store 108 to determine an action taken, such as a change of state of the mode command 124 (e.g., transition to manual driving mode). Time-averaged fused state data of the history data store 108 can be used as a baseline state to filter noise, and relative changes of the fused state data 114 from the recent data store 106 can indicate a likely transition request. For instance, a combination of state values of body position, face/head position, eye gaze, hand position, EPS input sensed from EPS torque 116 and/or EPS position 118 can be determined from both the recent data store 106 and the history data store 108 to interpret driver intent in making the decision to relinquish automatic control and transition to manual steering. A combination of a straight body position and/or a straight face/head position and/or an on-road eye gaze and/or an on-wheel hand position, and a sensed EPS input can confirm that the driver is ready to transition from automatic control to manual control. In another embodiment, a weighted average Alert index=$w_1 \times$body boolean+$w_2 \times$face/head position boolean+$w_3 \times$eye gaze boolean+$w_4 \times$hands on wheel boolean, where the weighted average Alert index can be passed through a low pass filter. If automatic control is not relinquished soon enough, the driver may be opposed with excess efforts by the steering system 12, resulting in increased difficulty in manually controlling steering of the vehicle 10. To ensure that control is not erroneously relinquished, an autonomous driving transition confirmation process can also be performed as further described herein.

Figure 3:
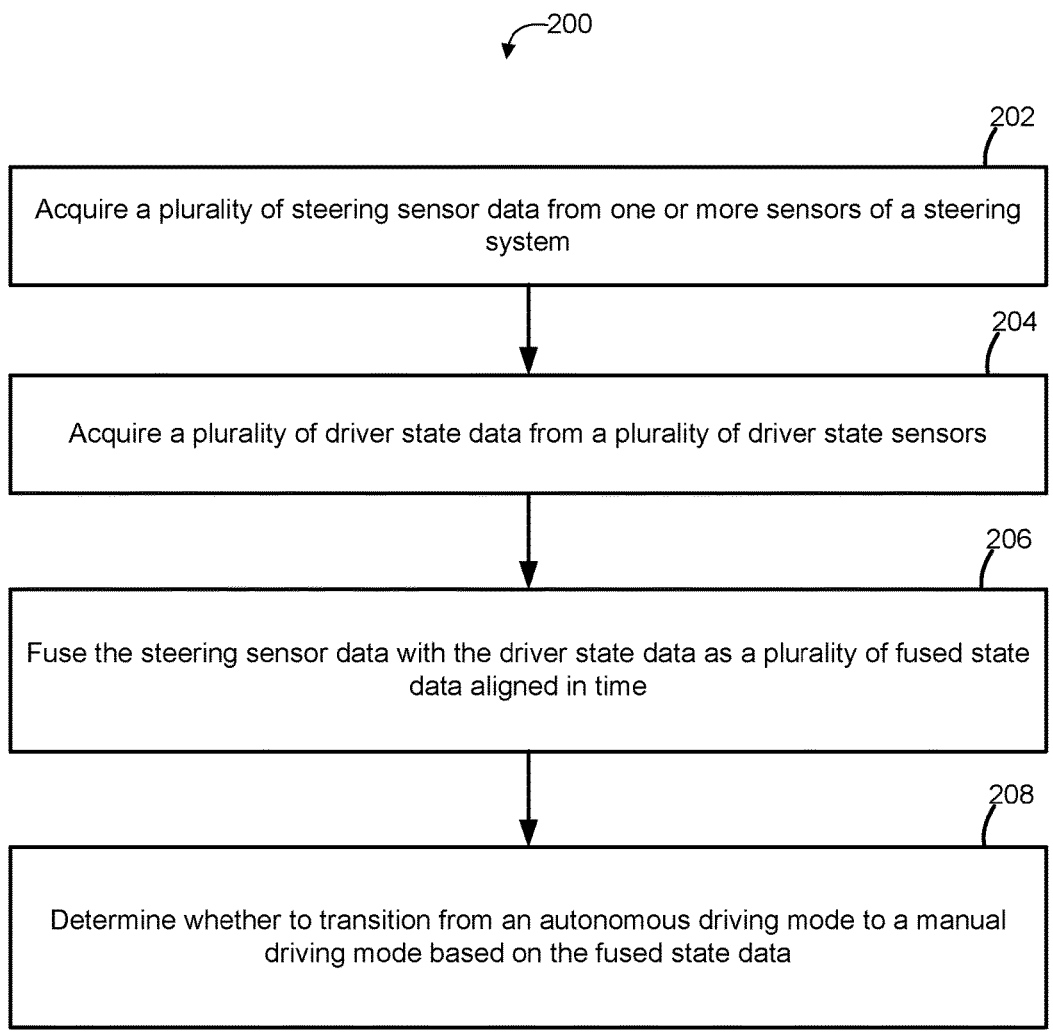
FIG. 3 illustrates a process for sensor fusion for autonomous driving transition control in accordance with some embodiments.

FIG. 3 illustrates a process 200 for sensor fusion for autonomous driving transition control. Process 200 is described in further reference to FIGS. 1 and 2. The process 200 can be performed by the control module 40 of FIGS. 1 and 2. At block 202, the control module 40 acquires a plurality of steering sensor data 110 from one or more sensors 31-33 of the steering system 12. At block 204, the control module 40 acquires a plurality of driver state data 112 from a plurality of driver state sensors 34, 35. At block 206, the sensor fusion module 102 fuses the steering sensor data 110 with the driver state data 112 as a plurality of fused state data 114 aligned in time. At block 208, the decision making module 104 of the control module 40 determines whether to transition from an autonomous driving mode to a manual driving mode based on the fused state data 114. The decision making module 104 can access the fused state data 114 stored in the recent data store 106 and in the history data store 108 (e.g., as time-averaged fused state data) for comparison against the transition criteria 126 to determine the mode command 124.

Figure 4:
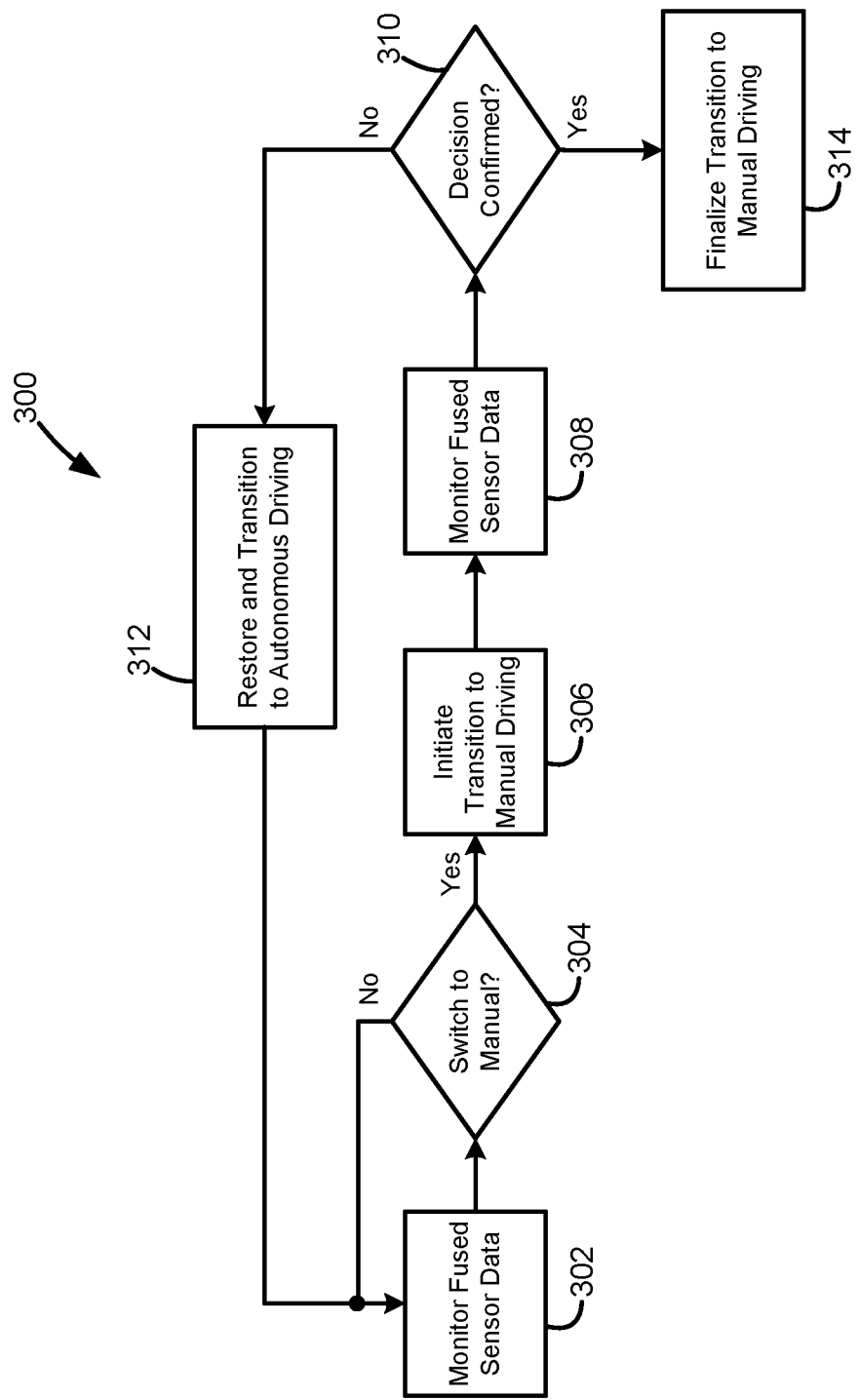
FIG. 4 illustrates a process for autonomous driving transition confirmation in accordance with some embodiments.

FIG. 4 illustrates a process 300 for autonomous driving transition confirmation. Process 300 is described in further reference to FIGS. 1-3. Process 300 can be performed in combination with process 200 of FIG. 3. At block 302, the fused sensor data 114 is monitored by the decision making module 104 to determine whether a change to the mode command 124 is intended by the driver. At block 304, if the decision making module 104 determines that no switch to manual mode should be performed based on comparing the fused sensor data 114 from the recent data store 106 in combination with the history data store 108 to the transition criteria 126, the process 300 returns to block 302 to continue monitoring the fused sensor data 114. If a switch to manual mode is determined at block 304, then a transition to manual driving is initiated at block 306, for instance, by reducing automated steering control inputs applied to the steering actuator motor 19. At block 308, the decision making module 104 continues to monitor the fused state data 114 after the transition from the autonomous driving mode to the manual driving mode has been initiated. At block 310, the decision making module 104 confirms whether to revert to the autonomous driving mode based on transition validity criteria in the transition criteria 126. For instance, if the fused state data 114 in the recent data store 106 and/or the history data store 108 indicates that the driver is not in an attentive state or inputs have become obstructed, the decision making module 104 can restore and transition back to autonomous driving at block 312. If the driver remains attentive for a predetermined period of time after the transition occurs (e.g., a period of time greater than or equal to the time storage capacity of the history data store 108), then the decision is confirmed and the transition to manual driving is finalized at block 314.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A system for sensor fusion for autonomous driving transition control, the system comprising:
   a processor operable to receive a plurality of steering sensor data from one or more sensors of a steering system and receive a plurality of driver state data from a plurality of driver state sensors, the processor configured to:
   fuse the steering sensor data with the driver state data as a plurality of fused state data aligned in time;
   determine whether to transition from an autonomous driving mode to a manual driving mode based on the fused state data;
   command a steering motor actuator of the steering system autonomously in the autonomous driving mode;
   command the steering motor actuator responsive to a driver input in the manual driving mode;
   determine an attentive state of a driver based on time-averaging of the fused state data;
   continue monitoring the fused state data after the transition from the autonomous driving mode to the manual driving mode has been initiated to determine an attentive state of a driver based on time-averaging of the fused state data; and
   revert from the manual driving mode to the autonomous driving mode based on determining that the attentive state of the driver no longer meets one or more transition validity criteria.

2. The system of claim 1, wherein the steering sensor data comprise sensed or derived data from one or more of a handwheel torque sensor and a handwheel position/velocity sensor.

3. The system of claim 1, wherein the driver state data comprise sensed or derived data from one or more of handwheel touch sensor and a camera.

4. The system of claim 3, wherein the driver state data sensed or derived from the handwheel touch sensor comprises one or more of: an area of contact with a handwheel, a width of contact with the handwheel, a force of contact with the handwheel, and a position of contact with the handwheel, and wherein the driver state data sensed or derived from the camera comprises one or more of: a driver body posture, a driver head pose, a driver eye gaze, and a driver hand position.

5. The system of claim 1, further comprising a recent data store of the fused state data and a history data store of the fused state data, wherein the history data store is operable to collect older values of the fused state data than collected in the recent data store.

6. The system of claim 5, wherein the processor is configured to average multiple samples of the fused state data from the history data store as time-averaged fused state data and determine whether to transition from the autonomous driving mode to the manual driving mode based on the fused state data from the recent data store in combination with the time-averaged fused state data.

7. The system of claim 1, wherein the processor is further configured to revert from the manual driving mode to the autonomous driving mode based on determining that an input from one or more of the driver state sensors is obstructed while monitoring the fused state data after the transition from the autonomous driving mode to the manual driving mode has been initiated.

8. A steering system comprising:
one or more sensors operable to produce a plurality of steering sensor data;
a plurality of driver state sensors operable to produce a plurality of driver state data;
a steering actuator motor; and
a control module comprising a processor operable to command the steering actuator motor in an autonomous driving mode and in a manual driving mode, the control module further operable to fuse the steering sensor data with the driver state data as a plurality of fused state data aligned in time, determine whether to transition from the autonomous driving mode to the manual driving mode based on the fused state data, determine an attentive state of a driver based on time-averaging of the fused state data, continue monitoring the fused state data after the transition from the autonomous driving mode to the manual driving mode has been initiated to determine an attentive state of a driver based on time-averaging of the fused state data, and revert from the manual driving mode to the autonomous driving mode based on determining that the attentive state of the driver no longer meets one or more transition validity criteria.

9. The steering system of claim 8, wherein the steering sensor data comprise sensed or derived data from one or more of a handwheel torque sensor and a handwheel position/velocity sensor.

10. The steering system of claim 8, wherein the driver state data comprise sensed or derived data from one or more of handwheel touch sensor and a camera.

11. The steering system of claim 10, wherein the driver state data sensed or derived from the handwheel touch sensor comprises one or more of: an area of contact with a handwheel, a width of contact with the handwheel, a force of contact with the handwheel, and a position of contact with the handwheel, and wherein the driver state data sensed or derived from the camera comprises one or more of: a driver body posture, a driver head pose, a driver eye gaze, and a driver hand position.

12. The steering system of claim 8, wherein the control module comprises a recent data store of the fused state data and a history data store of the fused state data, wherein the history data store is operable to collect older values of the fused state data than collected in the recent data store.

13. The steering system of claim 12, wherein the control module is operable to average multiple samples of the fused state data from the history data store as time-averaged fused state data and determine whether to transition from the autonomous driving mode to the manual driving mode based on the fused state data from the recent data store in combination with the time-averaged fused state data.

14. The steering system of claim 8, wherein the processor is further configured to revert from the manual driving mode to the autonomous driving mode based on determining that an input from one or more of the driver state sensors is obstructed while monitoring the fused state data after the transition from the autonomous driving mode to the manual driving mode has been initiated.

15. A method for sensor fusion for autonomous driving transition control, the method comprising:
acquiring, by a processor of a control module, a plurality of steering sensor data from one or more sensors of a steering system;
acquiring, by the processor of the control module, a plurality of driver state data from a plurality of driver state sensors;
fusing, by the processor of the control module, the steering sensor data with the driver state data as a plurality of fused state data aligned in time;
determining, by the processor of the control module, whether to transition from an autonomous driving mode to a manual driving mode based on the fused state data;
commanding, by the processor of the control module, a steering motor actuator of the steering system autonomously in the autonomous driving mode;
commanding, by the processor of the control module, the steering motor actuator responsive to a driver input in the manual driving mode;
determining, by the processor of the control module, an attentive state of a driver based on time-averaging of the fused state data;
continuing monitoring, by the processor of the control module, the fused state data after the transition from the autonomous driving mode to the manual driving mode has been initiated to determine an attentive state of a driver based on time-averaging of the fused state data; and
reverting, by the processor of the control module, from the manual driving mode to the autonomous driving mode based on determining that the attentive state of the driver no longer meets one or more transition validity criteria.

16. The method of claim 15, wherein the steering sensor data comprise sensed or derived data from one or more of a handwheel torque sensor and a handwheel position/velocity sensor.

17. The method of claim 15, wherein the driver state data comprise sensed or derived data from one or more of handwheel touch sensor and a camera, the driver state data sensed or derived from the handwheel touch sensor comprises one or more of: an area of contact with a handwheel, a width of contact with the handwheel, a force of contact with the handwheel, and a position of contact with the handwheel, and wherein the driver state data sensed or derived from the camera comprises one or more of: a driver body posture, a driver head pose, a driver eye gaze, and a driver hand position.

18. The method of claim 15, further comprising:
storing the fused state data in a recent data store; and
storing the fused state data in the history data store, wherein the history data store collects older values of the fused state data than collected in the recent data store.

19. The method of claim 18, further comprising:
averaging multiple samples of the fused state data from the history data store as time-averaged fused state data; and
determining whether to transition from the autonomous driving mode to the manual driving mode based on the fused state data from the recent data store in combination with the time-averaged fused state data.

20. The method of claim 15, further comprising:
reverting from the manual driving mode to the autonomous driving mode based on determining that an input from one or more of the driver state sensors is obstructed while monitoring the fused state data after the transition from the autonomous driving mode to the manual driving mode has been initiated.

* * * * *